(12) United States Patent
Saito

(10) Patent No.: US 10,749,866 B2
(45) Date of Patent: Aug. 18, 2020

(54) COMMUNICATION SYSTEM, NON-TRANSITORY COMPUTER-READABLE RECORDING MEDIUM STORING COMPUTER-READABLE INSTRUCTIONS FOR REGISTRATION MEDIATING SERVER, AND NON-TRANSITORY COMPUTER-READABLE RECORDING MEDIUM STORING COMPUTER-READABLE INSTRUCTIONS FOR SERVICE PROVIDING SERVER

(71) Applicant: Brother Kogyo Kabushiki Kaisha, Nagoya-shi, Aichi-ken (JP)

(72) Inventor: Ken Saito, Tokoname (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 16/558,722

(22) Filed: Sep. 3, 2019

(65) Prior Publication Data

US 2020/0076803 A1  Mar. 5, 2020

(30) Foreign Application Priority Data

Sep. 3, 2018 (JP) ................................. 2018-164709

(51) Int. Cl.
  *G06F 3/12* (2006.01)
  *H04L 29/06* (2006.01)
  (Continued)

(52) U.S. Cl.
  CPC ........ *H04L 63/0876* (2013.01); *G06F 3/1204* (2013.01); *G06F 3/1231* (2013.01);
  (Continued)

(58) Field of Classification Search
  CPC ... H04L 63/0876; H04L 67/16; H04L 63/083; H04L 67/02; H04L 67/42; G06F 3/1231;
  (Continued)

(56) References Cited

U.S. PATENT DOCUMENTS

2001/0025348 A1* 9/2001 Takaragi ................. G06F 21/32
  726/32
2016/0044033 A1* 2/2016 Hsiang ................ H04L 63/0853
  726/5

(Continued)

FOREIGN PATENT DOCUMENTS

WO  2018-092876 A1  5/2018

OTHER PUBLICATIONS

"Welcome to HP Customer Support", Retrieved Jul. 31, 2018 <URL: https://support.hp.com/us-en/document/c05497637>.

*Primary Examiner* — Moustapha Diaby
(74) *Attorney, Agent, or Firm* — Banner & Witcoff, Ltd.

(57) ABSTRACT

A registration mediating server may send to a function mediating server a first authentication information request, receive from the function mediating server first authentication information, send to the function mediating server an execution information request, receive from the function mediating server specific execution information, and send to a specific server communication information including the first authentication information and the specific execution information. The specific server may register the communication information, receive from a sound input device a first function execution request, extract the first authentication information and the specific execution information, and send to the function mediating server a second function execution request including related information which is related to the extracted specific execution information by using the first authentication information. The function mediating server may send a function execution instruction (Continued)

to a function executing device by using the related information. The function executing device may execute a function.

12 Claims, 8 Drawing Sheets

(51) Int. Cl.
*H04L 29/08* (2006.01)
*G06F 3/16* (2006.01)
*H04N 1/00* (2006.01)
*H04R 1/02* (2006.01)

(52) U.S. Cl.
CPC ............ *G06F 3/1254* (2013.01); *G06F 3/167* (2013.01); *H04L 63/083* (2013.01); *H04L 67/16* (2013.01); *H04N 1/00403* (2013.01); *G06F 3/1288* (2013.01); *H04L 67/02* (2013.01); *H04L 67/42* (2013.01); *H04R 1/028* (2013.01)

(58) Field of Classification Search
CPC ...... G06F 3/1204; G06F 3/1254; G06F 3/167; G06F 3/1288; H04N 1/00403; H04R 1/028
See application file for complete search history.

(56) References Cited

U.S. PATENT DOCUMENTS

| | | |
|---|---|---|
| 2017/0048240 A1* | 2/2017 | Chang ..................... G06F 21/32 |
| 2019/0102116 A1* | 4/2019 | Fukumoto ............. G06F 3/1292 |
| 2020/0084299 A1* | 3/2020 | Nakamura .............. H04L 69/16 |

\* cited by examiner (Comparative Example)

(Print Process)

(Second Embodiment; Print Process)

COMMUNICATION SYSTEM, NON-TRANSITORY COMPUTER-READABLE RECORDING MEDIUM STORING COMPUTER-READABLE INSTRUCTIONS FOR REGISTRATION MEDIATING SERVER, AND NON-TRANSITORY COMPUTER-READABLE RECORDING MEDIUM STORING COMPUTER-READABLE INSTRUCTIONS FOR SERVICE PROVIDING SERVER

CROSS-REFERENCE

This application claims priority to Japanese Patent Application No. 2018-164709, filed on Sep. 3, 2018, the entire contents of which are incorporated herein by reference.

TECHNICAL FIELD

The disclosure herein discloses a technique for causing a function executing device to execute a function by using a sound input device.

BACKGROUND ART

A technique is known which causes a printer to execute printing by using a so-called smart speaker.

SUMMARY

For example, in a case of causing a printer to execute printing by using a PC, a user needs to perform, on the PC, an operation to select identification information of a target printer that is to execute the printing, an operation to designate print settings, an operation to select a file name of a file representing an image to be printed, and the like. Even in a case of causing a printer to execute printing by using a smart speaker, it is assumed that sound inputs corresponding to the aforementioned operations are necessary. In some cases, the user may have difficulty in inputting information related to printing (such as identification information and print settings of a printer, and a file name) by sound.

The disclosure herein discloses a technique that enables a user to easily cause a function executing device to execute a function by using a sound input device.

A communication system disclosed herein may comprise a terminal device, a specific server, a registration mediating server, a function mediating server, a sound input device, and a function executing device. The terminal device may send to the specific server a registration request for requesting a registration of communication information. In a case where the registration request is received from the terminal device, the specific server may send to the registration mediating server a communication information request for requesting sending of the communication information. In a case where the communication information request is received from the specific server, the registration mediating server may send to the function mediating server a first authentication information request for requesting sending of first authentication information. In a case where the first authentication information request is received from the registration mediating server, the function mediating server may send the first authentication information to the registration mediating server. In a case where the first authentication information is received from the function mediating server, the registration mediating server may send to the function mediating server, by using the first authentication information, an execution information request for requesting sending of execution information, the execution information being for causing the function executing device to execute a function. In a case where the execution information request is received from the registration mediating server, the function mediating server may send specific execution information to the registration mediating server. In a case where the specific execution information is received from the function mediating server, the registration mediating server may send to the specific server the communication information including the first authentication information and the specific execution information. In a case where the communication information is received from the registration mediating server, the specific server may register the communication information in a memory of the specific server. In a case where an execution request of the function is inputted by sound without the specific execution information being inputted by sound, the sound input device may send a first function execution request to the specific server. In a case where the first function execution request is received from the sound input device, the specific server may extract the first authentication information and the specific execution information from the communication information, and send a second function execution request to the function mediating server by using the extracted first authentication information, the second function execution request including related information which is related to the extracted specific execution information. In a case where the second function execution request is received from the specific server, the function mediating server may send a function execution instruction to the function executing device by using the related information included in the second function execution request. In a case where the function execution instruction is received from the function mediating server, the function executing device may execute the function.

The disclosure herein also discloses a non-transitory computer-readable recording medium storing computer-readable instructions for a registration mediating server. The computer-readable instructions, when executed by a computer of the registration mediating server, may cause the registration mediating server to: receive from a service mediating server a communication information request for requesting sending of communication information, wherein the communication information request is sent from the service mediating server to the registration mediating server in a case where a registration request for requesting registration of the communication information is sent from a terminal device to the service mediating server; in a case where the communication information request is received from the service mediating server, send to a function mediating server a first authentication information request for requesting sending of first authentication information; in a case where the first authentication information request is sent to the function mediating server, receive the first authentication information from the function mediating server; in a case where the first authentication information is received from the function mediating server, send to the function mediating server, by using the first authentication information, an execution information request for requesting sending of execution information, the execution information being for causing a function executing device to execute a function; in a case where the execution information request is sent to the function mediating server, receive specific execution information from the function mediating server; and in a case where the specific execution information is received from the function mediating server, send to the service mediating server the communication information including the first authentication information and the specific execution information, wherein the communication information is registered in the service mediating server, in a case where an execution request of the function is inputted to a sound input device by sound without the specific execution information being inputted to the sound input device by sound after the communication information has been registered, a first function execution request is sent from the sound input device to the service mediating server, in a case where the first function execution request is received by the service mediating server, a service provision request including the communication information registered in the service mediating server is sent from the service mediating server to a service providing server, in a case where the service provision request is received by the service providing server, the first authentication information and the specific execution information are extracted by the service providing server from the communication information included in the service provision request, and a second function execution request including related information which is related to the extracted specific execution information is sent from the service providing server to the function mediating server by using the extracted first authentication information, in a case where the second function execution request is received by the function mediating server, a function execution instruction is sent from the function mediating server to the function executing device by using the related information included in the second function execution request, and in a case where the function execution instruction is received by the function executing device, the function is executed by the function executing device.

The disclosure herein also discloses a non-transitory computer-readable recording medium storing computer-readable instructions for a service providing server. The computer-readable instructions, when executed by a computer of the registration mediating server, may cause the service providing server to: receive from a service mediating server a service provision request including communication information, the communication information including first authentication information and specific execution information for causing a function executing device to execute a function; and in a case where the service provision request is received from the service mediating server, extract the first authentication information and the specific execution information from the communication information included in the service provision request, and send a second function execution request to the function mediating server by using the extracted first authentication information, the second function execution request including related information which is related to the extracted specific execution information, wherein in a case where an execution request of the function is inputted to a sound input device by sound without the specific execution information being inputted to the sound input device by sound, a first function execution request is sent from the sound input device to the service mediating server, in a case where the first function execution request is received by the service mediating server, the service provision request including the communication information is sent from the service mediating server to the service providing server, in a case where the second function execution request is received by the function mediating server, a function execution instruction is sent from the function mediating server to the function executing device by using the related information included in the second function execution request, and in a case where the function execution instruction is received by the function executing device, the function is executed by the function executing device.

The registration mediating server itself, the service providing server itself, a control method for realizing the registration mediating server, and a control method for realizing the service providing server are also novel and useful.

EMBODIMENTS

Figure 1:
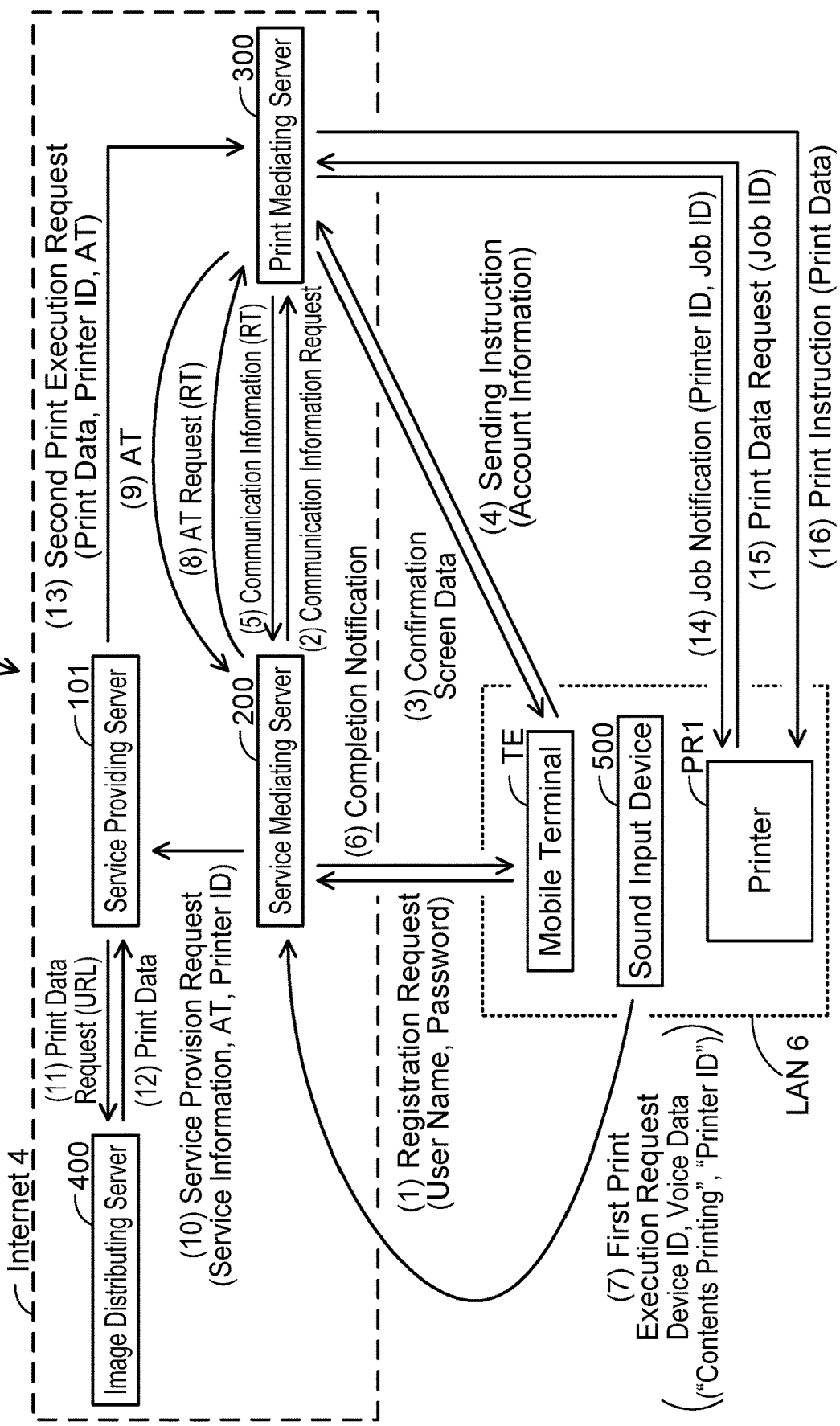
FIG. 1 shows an explanatory diagram for explaining an overview of a comparative example.

First Embodiment (Overview of Comparative Example; FIG. 1)

Before explaining an embodiment, an overview of a comparative example will be described with reference to FIG. 1. A communication system according to the comparative example is provided with a service providing server 101, a service mediating server 200, a print mediating server 300, an image distributing server 400, a sound input device 500, a printer PR1, and a mobile terminal TE. The sound input device 500, the printer PR1, and the mobile terminal TE belong to a same Local Area Network (LAN) 6. The LAN 6 is connected to the Internet 4. The service providing server 101, the service mediating server 200, the print mediating server 300, and the image distributing server 400 are provided on the Internet 4. That is, the devices 500, PR1, TE are communicable with the servers 101, 200, 300, 400 through the LAN 6 and the Internet 4.

The service providing server 101 is a server configured to provide a service of causing a printer (such as PR1) to execute printing according to print data distributed from the image distributing server 400. The service mediating server 200 is a server configured to instruct the service providing server 101 to provide the service in response to a request for the service from the sound input device 500. The print mediating server 300 is a server configured to mediate printing between a printer (such as PR1) and an external device (such as the service providing server 101). The image distributing server 400 is a server configured to distribute print data representing an image.

The sound input device 500 is provided with a microphone, which is not shown, and is configured to accept a sound input from a user through the microphone. In a variant, the sound input device 500 may further be provided with a speaker. That is, the sound input device 500 may be a so-called smart speaker. The printer PR1 is a peripheral device (that is, a peripheral device of the mobile terminal TE, etc.) configured to execute a print function. The mobile terminal TE is a portable terminal device such as a cell phone (such as a smartphone), a PDA, a notebook PC, and a tablet PC. In a variant, the mobile terminal TE may be a stationary terminal device (such as a desktop PC).

In the comparative example, a situation is assumed in which the sound input device 500 is used to cause the printer PR1 to execute printing according to print data distributed by the image distributing server 400. In order to do so, firstly a registration process for registering communication information in the service mediating server 200 is executed. The registration process includes processes (1) to (6) described below.

(1) The mobile terminal TE sends to the service mediating server 200 a registration request that requests registration of communication information.

In case of (1) receiving the registration request from the mobile terminal TE, (2) the service mediating server 200 sends to the print mediating server 300 a communication information request that requests sending of communication information.

In case of (2) receiving the communication information request from the service mediating server 200, (3) the print mediating server 300 sends to the mobile terminal TE confirmation screen data representing a confirmation screen. The confirmation screen is a screen for confirming whether to send communication information, and includes an input box in which account information for logging into the print mediating server 300 is to be inputted and an OK button for instructing sending of communication information.

In case of (3) receiving the confirmation screen data from the print mediating server 300, the mobile terminal TE displays the confirmation screen represented by the confirmation screen data. Then, in a case where the account information is inputted to the confirmation screen and the OK button in the confirmation screen is selected, (4) the mobile terminal TE sends a sending instruction including the inputted account information to the print mediating server 300.

The print mediating server 300 has account information of a user of the printer PR1 registered therein in advance. In case of (4) receiving the sending instruction from the mobile terminal TE, the print mediating server 300 determines that the account information in the sending instruction is already registered and (5) sends communication information including a refresh token (hereinbelow termed "RT") to the service mediating server 200.

In case of (5) receiving the communication information from the print mediating server 300, the service mediating server 200 registers the communication information in association with a device ID that is registered in the service mediating server 200 in advance. The device ID is information that identifies the sound input device 500. Then, (6) the service mediating server 200 sends to the mobile terminal TE a completion notification indicating that registration of the communication information has been completed, and thereby the registration process is completed. After this, a print process for causing the printer PR1 to print an image distributed by the image distributing server 400 is executed. The print process includes processes (7) to (16) described below.

The sound input device 500 accepts, from the user, voice that instructs a printer to be caused to execute printing of an image distributed by the image distributing server 400 and voice that designates a printer ID of the printer PR1, which is a printer to be caused to execute printing. The printer ID is information that identifies the printer PR1. Then, the sound input device 500 converts the voices, which are analog data, to voice data, which is digital data. That is, the sound input device 500 converts the voice instructing the printer to be caused to execute printing of the image distributed by the image distributing server 400 into voice data "contents printing", and converts the voice designating the printer ID of the printer PR1 into voice data "printer ID". Then, (7) the sound input device 500 sends to the service mediating server 200 a first print execution request including the device ID, the voice data "contents printing" and "printer ID". In case of (7) receiving the first print execution request from the sound input device 500, the service mediating server 200 specifies service information stored in association with the voice data "contents printing" included in the first print execution request. The service information is information that identifies a service provided by the service providing server 101. Further, the service mediating server 200 (8) sends an access token (hereinbelow termed "AT") request including the RT to the print mediating server 300 and (9) receives an AT from the print mediating server 300. Then, (10) the service mediating server 200 sends a service provision request to the service providing server 101. The service provision request includes the specified service information, the received AT, and the printer ID indicated by the voice data "printer ID". In case of (10) receiving the service provision request from the service mediating server 200, the service providing server 101 specifies a Uniform Resource Locater (URL) stored in association with the service information included in the service provision request. This URL is information indicating a location of the image distributing server 400. Then, (11) the service providing server 101 sends a print data request including the specified URL to the image distributing server 400. In this case, (12) the service providing server 101 receives print data from the image distributing server 400. After this, (13) the service providing server 101 sends a second print execution request to the print mediating server 300. The second print execution request includes the received print data, the printer ID included in the service provision request, and the AT included in the service provision request.

In case of (13) receiving the second print execution request from the service providing server 101, the print mediating server 300 generates a job ID identifying a print job and registers the print job. The print job includes the generated job ID, the print data included in the second print execution request, and the printer ID included in the second print execution request. Then, (14) the print mediating server 300 sends a job notification, which indicates that the print job has been registered, to the printer PR1 identified by the printer ID in the print job. The job notification includes the printer ID in the print job and the job ID in the print job.

In case of (14) receiving the job notification from the print mediating server 300, (15) the printer PR1 sends to the print mediating server 300 a print data request that requests sending of the print data. The print data request includes the job ID included in the job notification.

In case of (15) receiving the print data request from the printer PR1, the print mediating server 300 specifies the print job identified by the job ID included in the print data request. Then, (16) the print mediating server 300 sends to the printer PR1 a print instruction including the print data in the specified print job.

In case of (16) receiving the print instruction from the print mediating server 300, the printer PR1 executes printing according to the print data included in the print instruction. Thereby, the user can cause the printer PR1 to print the image distributed by the image distributing server 400 by using the sound input device 500.

In (7) above, the user designates the printer ID of the printer PR1 by voice. However, in some cases, the user may have difficulty in inputting the printer ID by voice. For example, there is a possibility that the user does not know the printer ID. Further, for example, in a case where the printer ID is a long character string, there is a possibility that it is difficult for the user to accurately pronounce it. Further, it is burdensome to the user to make the user designate the printer ID by voice every time the user wishes to cause the printer PR1 to execute printing. In the present embodiment, the user can cause the printer PR1 to execute printing by using the sound input device 500, without the user inputting the printer ID of the printer PR1 to the sound input device 500 by voice.

Figure 2:
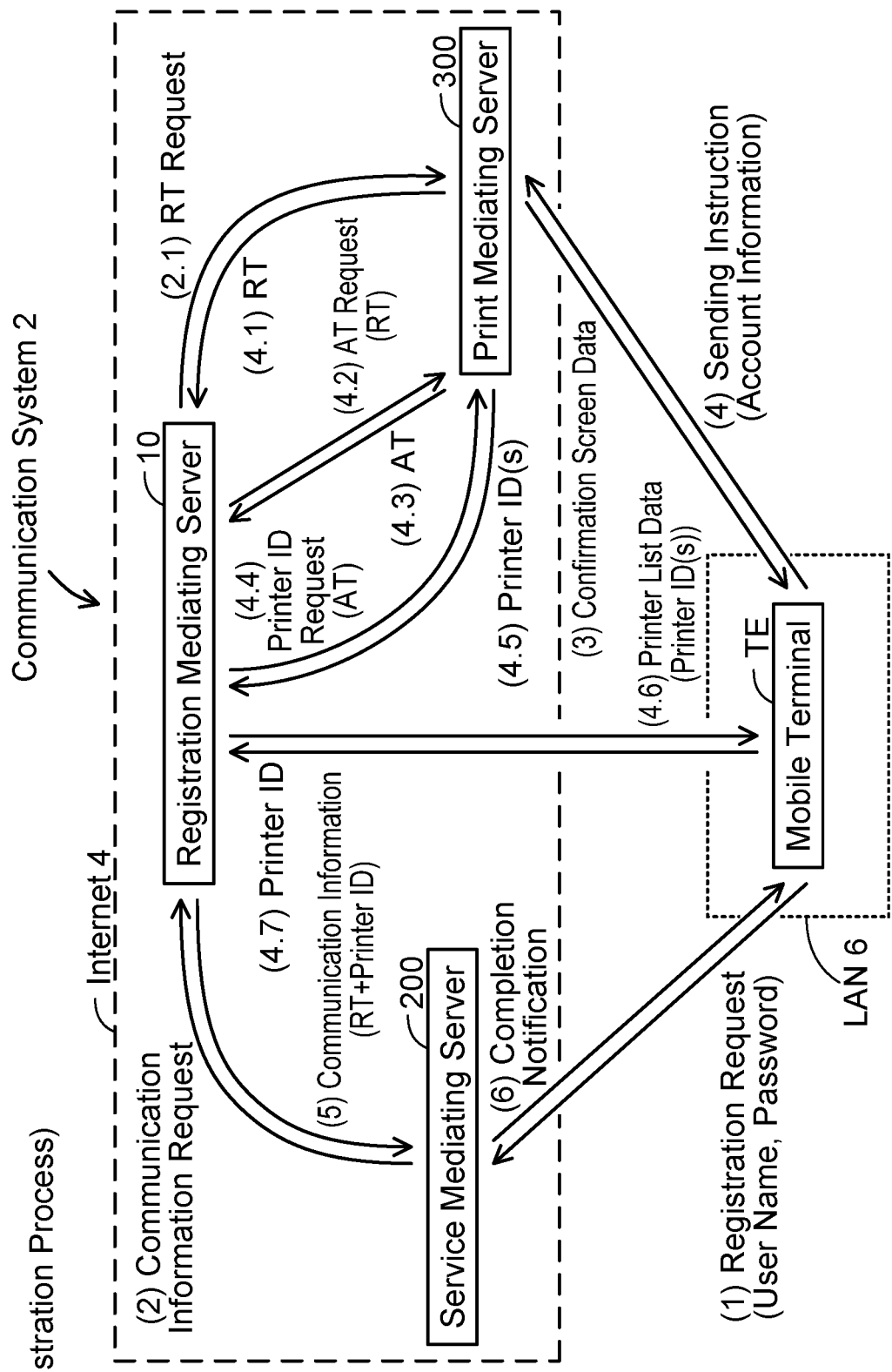
FIG. 2 shows an explanatory diagram for explaining an overview of a registration process according to an embodiment.
Figure 3:
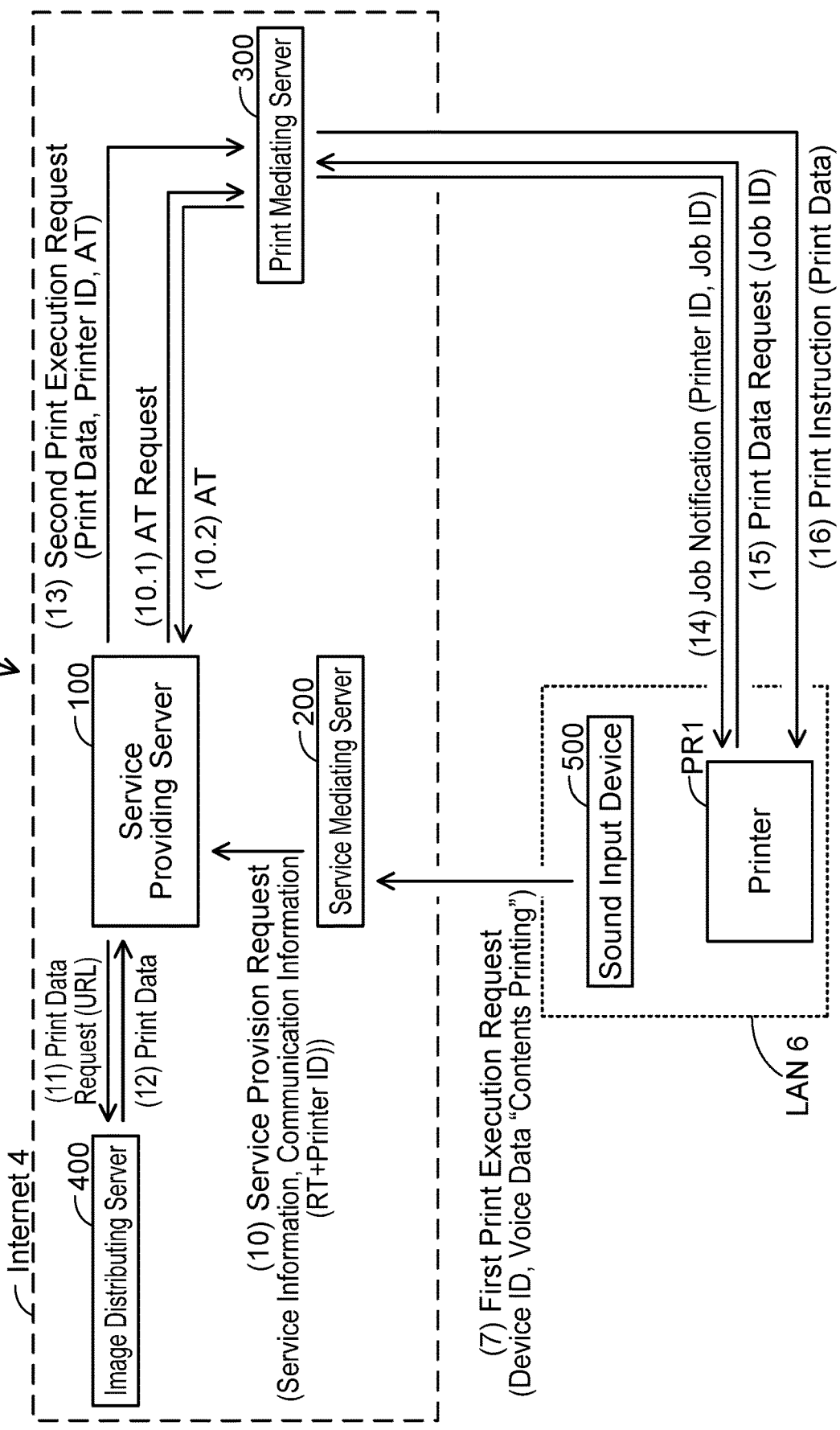
FIG. 3 shows an explanatory diagram for explaining an overview of a print process according to the embodiment.

Overview of Embodiment; FIGS. 2 and 3

Next, an overview of the present embodiment will be described with reference to FIGS. 2 and 3. A communication system 2 according to the present embodiment comprises a registration mediating server 10, a service providing server 100, a service mediating server 200, a print mediating server 300, an image distributing server 400, a sound input device 500, a printer PR1, and a mobile terminal TE. The devices 200, 300, 400, 500, PR1, TE are respectively same as the devices 200 and the like of the comparative example. Unlike the comparative example, the registration mediating server 10 is used in the present embodiment. The registration mediating server 10 is a server configured to mediate registration of communication information between the service mediating server 200 and the print mediating server 300. Further, the service providing server 100 is configured to execute processes different from those of the service providing server 101 of the comparative example. These servers 10, 100 are provided on the Internet 4. Firstly, a registration process according to the present embodiment will be described with reference to FIG. 2.

(1) is same as (1) in FIG. 1. (2) The service mediating server 200 sends a communication information request to the registration mediating server 10.

In case of (2) receiving the communication information request from the service mediating server 200, the registration mediating server 10 (2.1) sends to the print mediating server 300 an RT request that requests sending of an RT. (3) and (4) are same as (3) and (4) in FIG. 1.

In case of (4.1) receiving an RT from the print mediating server 300, the registration mediating server 10 (4.2) sends an AT request including the RT to the print mediating server 300 and (4.3) receives an AT from the print mediating server 300. In this case, the registration mediating server 10 (4.4) sends to the print mediating server 300 a printer ID request that requests sending of one or more printer IDs that are registered in the print mediating server 300 in advance. The printer ID request includes the AT.

In case of (4.4) receiving the printer ID request from the registration mediating server 10, (4.5) the print mediating server 300 sends one or more printer IDs to the registration mediating server 10.

In case of (4.5) receiving the one or more printer IDs from the print mediating server 300, (4.6) the registration mediating server 10 sends to the mobile terminal TE printer list data representing a printer list, which is a list of the received one or more printer IDs.

In case of (4.6) receiving the printer list data from the registration mediating server 10, the mobile terminal TE displays the printer list represented by the printer list data. Then, in a case where the printer ID of the printer PR1, which is to be caused to execute printing, is selected in the printer list, (4.7) the mobile terminal TE sends the selected printer ID to the registration mediating server 10.

In case of (4.7) receiving the printer ID from the mobile terminal TE, (5) the registration mediating server 10 sends to the service mediating server 200 communication information including the RT received in (4.1) above and the received printer ID.

In case of (5) receiving the communication information from the registration mediating server 10, the service mediating server 200 registers the communication information in association with the device ID and (6) sends a completion notification to the mobile terminal TE. When the process of (6) is completed, the registration process is terminated.

(Print Process; FIG. 3)

Next, an overview of a print process according to the present embodiment will be described with reference to FIG. 3. In the present embodiment, the sound input device 500 accepts a voice input instructing that a printer is to be caused to execute printing of an image distributed by the image distributing server 400, without accepting a voice input designating the printer ID of the printer PR1 from the user. In this case, the sound input device 500 converts the voice to voice data "contents printing" and (7) sends to the service mediating server 200 a first print execution request including its device ID and the voice data "contents printing". In case of (7) receiving the first print execution request from the sound input device 500, the service mediating server 200 specifies service information associated with the voice data "contents printing" and (10) sends a service provision request including the specified service information and the registered communication information (see (5) in FIG. 2) to the service providing server 100.

In case of (10) receiving the service provision request from the service mediating server 200, the service providing server 100 extracts the RT and the printer ID from the communication information included in the service provision request, (10.1) sends an AT request including the extracted RT to the print mediating server 300, and (10.2) receives an AT from the print mediating server 300. Processes of (11) and (12) are same as (11) and (12) in FIG. 1. (13) The service providing server 100 sends a second print execution request to the print mediating server 300. The second print execution request includes the print data received from the image distributing server 400, the extracted printer ID, and the AT received in (10.2) above. Processes of (14) to (16) are same as (14) to (16) in FIG. 1. According to the above, the user can cause the printer PR1 to execute printing by using the sound input device 500, without inputting the printer ID of the printer PR1 to the sound input device 500 by voice.

Figure 4:
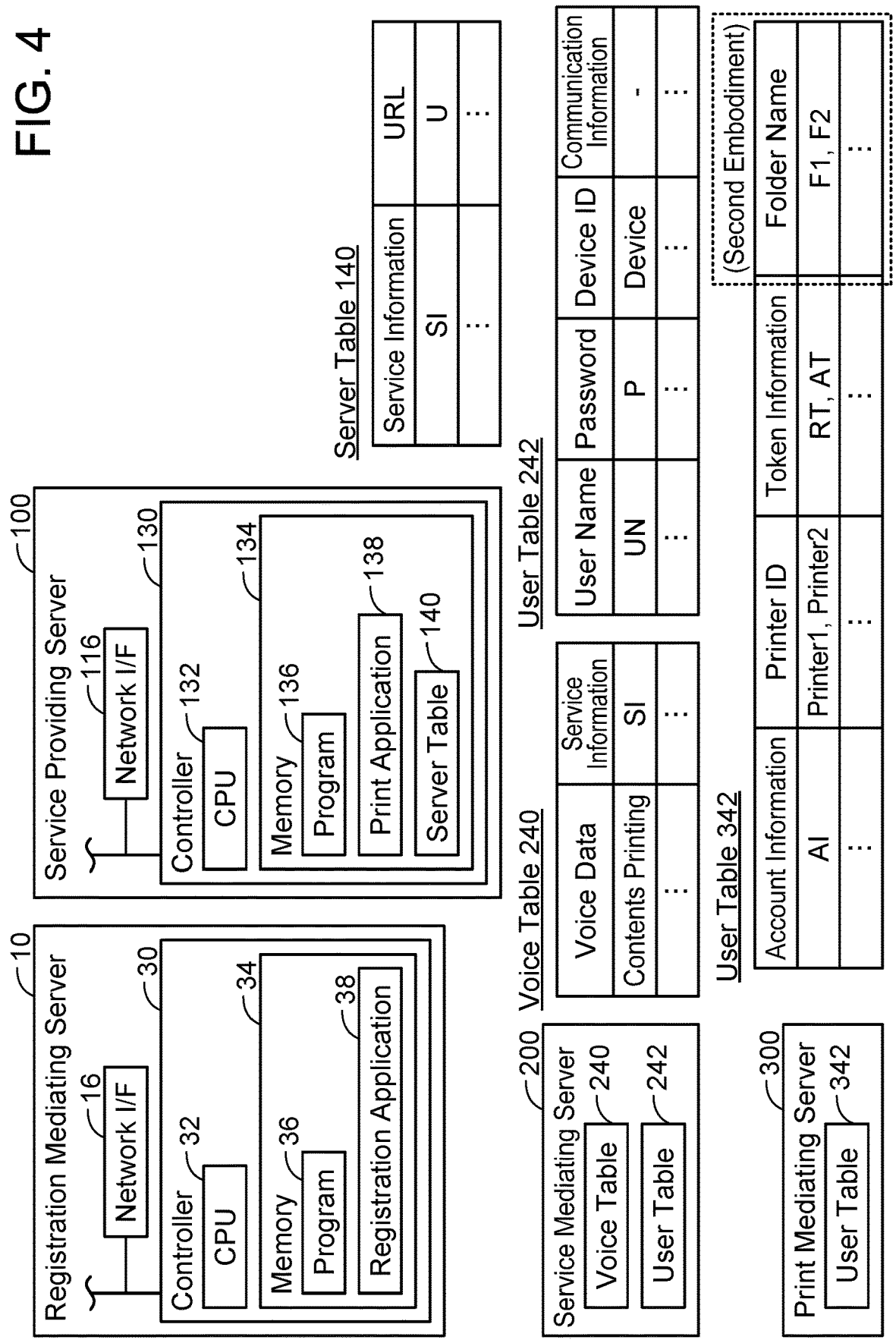
FIG. 4 shows configurations of devices.

(Configurations of Respective Devices; FIG. 4)

Next, configurations of the respective devices 10, 100, 200, 300 will be described with reference to FIG. 4. The registration mediating server 10 is a server configured to mediate registration of communication information between the service mediating server 200 and the print mediating server 300. That is, the registration mediating server 10 receives the RT from the print mediating server 300 (see (4.1) in FIG. 2), receives the printer ID from the mobile terminal TE (see (4.7) in FIG. 2), and sends the communication information including the RT and the printer ID to the service mediating server 200 (see (5) in FIG. 2). The registration mediating server 10 is provided on the Internet 4 by a vendor of the printer PR1. In a variant, the registration mediating server 10 may be provided on the Internet 4 by an entity different from the vendor. The registration mediating server 10 includes a network interface 16 and a controller 30. Hereinbelow, an interface will be simply termed "I/F". The network I/F 16 is an interface for connecting to the Internet 4.

The controller 30 includes a CPU 32 and a memory 34. The CPU 32 is configured to execute various processes according to a program 36 stored in the memory 34. The memory 34 is constituted of a volatile memory, a nonvolatile memory, and the like. The memory 34 further stores a registration application (hereinbelow simply termed "registration app") 38. The registration app 38 is an application for registering communication information in the service mediating server 200.

(Configuration of Service Providing Server 100)

The service providing server 100 is a server configured to provide a service of causing a printer to execute printing of an image distributed from the image distributing server 400. That is, the service providing server 100 acquires print data from the image distributing server 400 (see (11) and (12) in FIG. 3) and sends the second print execution request including the print data to the print mediating server 300 (see (13) in FIG. 3). The service providing server 100 is provided on the Internet 4 by an entity different from the vendor of the printer PR1 (such as Amazon.com). In a variant, the service providing server 100 may be provided on the Internet 4 by the vendor. The service providing server 100 includes a network I/F 116 and a controller 130. The network I/F 116 is an interface for connecting to the Internet 4.

The controller 130 includes a CPU 132 and a memory 134. The CPU 132 is configured to execute various processes according to a program 136 stored in the memory 134. The memory 134 is constituted of a volatile memory, a nonvolatile memory, and the like. The memory 134 further stores a print application (hereinbelow simply termed "print app") 138 and a server table 140. The print app 138 is an application for receiving print data from the image distributing server 400 and sending the print data to the print mediating server 300. The print app 138 is provided by the vendor of the printer PR1.

The server table 140 stores service information SI and a URL "U" in association with each other. The service information SI is information that identifies a service provided by the service providing server 100. The URL is location information for accessing the image distributing server 400.

(Configuration of Service Mediating Server 200)

The service mediating server 200 is a server configured to instruct a service providing server to provide a service in response to accepting a request for the service from the sound input device 500. That is, the service mediating server 200 receives the first print execution request from the sound input device 500 (see (7) in FIG. 3) and sends the service provision request to the service providing server 100 (see (10) in FIG. 3). The service mediating server 200 is provided on the Internet 4 by the same entity as the entity that provides the service providing server 100. In a variant, the service mediating server 200 may be provided on the Internet 4 by the vendor of the printer PR1. The service mediating server 200 stores a voice table 240 and a user table 242.

The voice table 240 stores voice data and service information in association with each other. For example, the voice data "contents printing" is associated with the service information SI.

The user table 242 stores a user name UN, a password P, a device ID "Device", and communication information in association with each other. The user name UN and the password P are information that identify a user of the printer PR1. The device ID "Device" is a device ID of the sound input device 500. The communication information in the user table 242 is in an empty state in an initial state, and communication information is registered in the user table 242 by the registration process described above (see FIG. 2).

(Configuration of Print Mediating Server 300)

The print mediating server 300 is a server configured to mediate printing between a printer (such as PR1) and an external device (such as the service providing server 100). That is, the print mediating server 300 receives the second print execution request including print data from the service providing server 100 (see (13) in FIG. 3) and sends this print data to the printer PR1 (see (16) in FIG. 3). The print mediating server 300, for example, is a Google Cloud Print (GCP) server provided by Google (registered trademark). However, in a variant, the print mediating server 300 may, for example, be a server provided by the vendor of the printer PRE The print mediating server 300 stores a user table 342.

The user table 342 stores account information AI, printer IDs "Printer1" and "Printer2", and token information in association with each other. The account information AI is account information for the user of the printer PR1 to log into the print mediating server 300. The printer ID "Printer1" is information that identifies the printer PR1, and the printer ID "Printer2" is information that identifies a printer (not shown) that is different from the printer PR1. This different printer has the same configuration as the printer PR1, and is owned by the user of the printer PR1. The token information includes an RT and an AT. The account information AI and the printer IDs "Printer1" and "Printer2" are registered in the print mediating server 300, for example, by the user operating the mobile terminal TE. Further, the token information is generated by the print mediating server 300 upon when the account information AI and the printer IDs "Printer1" and "Printer2" are registered in the print mediating server 300, and is registered to the user table 342.

Figure 5:
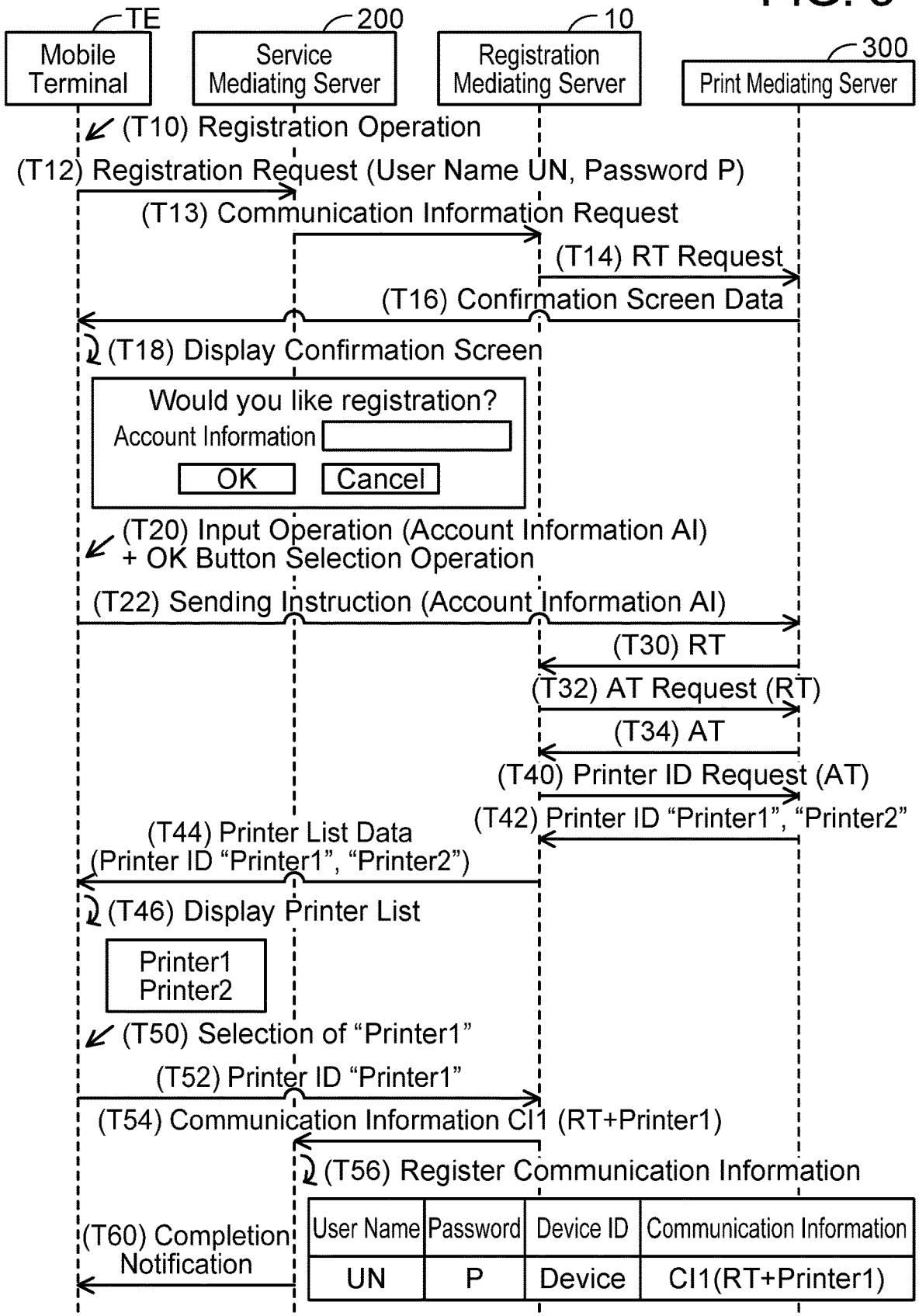
FIG. 5 shows a sequence diagram of the registration process.

(Registration Process; FIG. 5)

Next, details of processes executed in the registration process of FIG. 2 will be described with reference to FIG. 5. Hereinbelow, for the sake of easier understanding, operations which CPUs of the respective devices (such as the CPU 32 of the registration mediating server 10) execute will be described with the respective devices (such as the registration mediating server 10) as subjects of action instead of the CPUs as the subjects of action. Further, all communications executed by the registration mediating server 10 (or the service providing server 100) are executed through the network I/F 16 (or 116). As such, hereinbelow, the description of "through the network I/F 16 (or 116)" will be omitted.

In T10, the mobile terminal TE accepts, from the user, a registration operation that instructs registration of communication information. The registration operation includes an operation to input a URL representing a location of the service mediating server 200 and an operation to input the user name UN and the password P of the user. In this case, in T12, the mobile terminal TE sends a registration request including the user name UN and the password P to the service mediating server 200 ((1) in FIG. 2).

In a case of receiving the registration request from the mobile terminal TE in T12, the service mediating server 200 determines that the user name UN and the password P included in the registration request are already registered in the user table 242 (see FIG. 4), and sends a communication information request to the registration mediating server 10 in T13 ((2) in FIG. 2).

In a case of receiving the communication information request from the service mediating server 200 in T13, the registration mediating server 10 sends an RT request to the print mediating server 300 in T14 ((2.1) in FIG. 2).

In a case of receiving the RT request from the registration mediating server 10 in T14, the print mediating server 300 sends confirmation screen data to the mobile terminal TE in T16 ((3) in FIG. 2).

In a case of receiving the confirmation screen data from the print mediating server 300 in T16, the mobile terminal TE displays a confirmation screen represented by the confirmation screen data in T18. The confirmation screen includes an input box in which account information is to be inputted, an OK button, and a Cancel button. Then, in T20, the mobile terminal TE accepts an operation to input the account information AI and an operation to select the OK button from the user, and then in T22, it sends a sending instruction including the account information AI to the print mediating server 300 ((4) in FIG. 2).

In a case of receiving the sending instruction from the mobile terminal TE in T22, the print mediating server 300 determines that the account information AI included in the sending instruction is already registered in the user table 342, and specifies the RT in the token information associated with the account information AI in the user table 342. Then, in T30, the print mediating server 300 sends the specified RT to the registration mediating server 10 ((4.1) in FIG. 2). As above, in the present embodiment, the account information AI does not need to be sent to the registration mediating server 10 to send the RT to the registration mediating server 10. Due to this, security can be improved.

In a case of receiving the RT from the print mediating server 300 in T30, the registration mediating server 10 sends an AT request including the RT to the print mediating server 300 in T32 ((4.2) in FIG. 3).

In a case of receiving the AT request from the registration mediating server 10 in T32, the print mediating server 300 determines that the RT in the AT request is already registered in the user table 342, and specifies the AT in the token information including the RT in the user table 342. Then, in T34, the print mediating server 300 sends the specified AT to the registration mediating server 10 ((4.3) in FIG. 2).

In a case of receiving the AT from the print mediating server 300 in T34, the registration mediating server 10 sends a printer ID request including the AT to the print mediating server 300 in T40 ((4.4) in FIG. 3).

In a case of receiving the printer ID request from the registration mediating server 10 in T40, the print mediating server 300 determines that the AT included in the printer ID request is already registered in the user table 342, and specifies the printer IDs "Printer1" and "Printer2" associated with the token information including the AT in the user table 342. Then, the print mediating server 300 sends the specified printer IDs to the registration mediating server 10 in T42 ((4.5) in FIG. 2).

In a case of receiving the respective printer IDs from the print mediating server 300 in T42, the registration mediating server 10 generates printer list data representing a printer list, and sends the printer list data to the mobile terminal TE in T44 ((4.6) in FIG. 2).

In a case of receiving the print list data from the registration mediating server 10 in T44, the mobile terminal TE displays the printer list represented by the printer list data in T46. Then, in response to the printer ID "Printer1" in the printer list being selected by the user in T50, the mobile terminal TE sends the printer ID "Printer1" to the registration mediating server 10 in T52 ((4.7) in FIG. 2).

In a case of receiving the printer ID "Printer1" from the mobile terminal TE in T52, the registration mediating server 10 sends communication information CH including the RT received in T30 and the received printer ID "Printer1" to the service mediating server 200 in T54 ((5) in FIG. 2). More specifically, the registration mediating server 10 generates one character string by using a character string indicating the RT and a character string indicating the printer ID "Printer1", and sends that one character string to the service mediating server 200 as the communication information CI1. Due to this, the service mediating server 200 can use the communication information CH as one character string, despite the communication information CH including two pieces of information, which are the RT and the printer ID "Printer1".

In a case of receiving the communication information CH from the registration mediating server 10 in T54, the service mediating server 200 registers, in T56, the communication information CI1, in the user table 242, in association with the user name UN that is logged into the service mediating server 200. Then, in T60, the service mediating server 200 sends a completion notification to the mobile terminal TE ((6) in FIG. 2). When the process of T60 is completed, the process of FIG. 5 is terminated.

Figure 6:
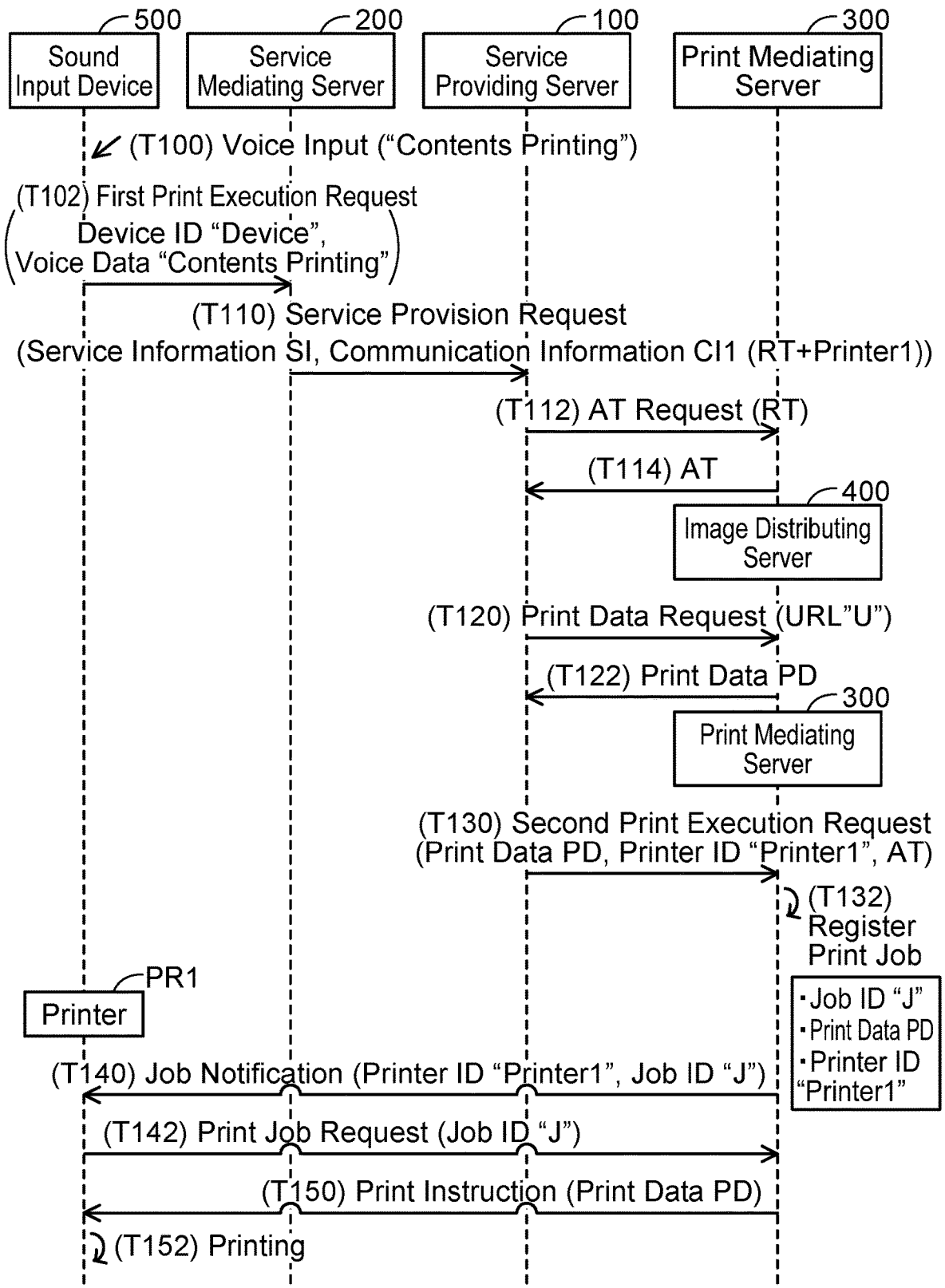
FIG. 6 shows a sequence diagram of the print process.

(Print Process; FIG. 6)

Next, details of processes executed in the print process of FIG. 3 will be described with reference to FIG. 6. The process of FIG. 6 is executed after the process of FIG. 5 has been executed.

In T100, the sound input device 500 accepts, from the user, a voice input instructing that a printer is caused to execute printing of an image distributed by the image distributing server 400 (that is, voice saying "contents printing"), without accepting a voice input designating the printer ID "Printer1" of the printer PR1 from the user. In this case, the sound input device 500 converts the voice to voice data "contents printing", and sends to the service mediating server 200 a first print execution request including the device ID "Device" of the sound input device 500 and the voice data "contents printing" in T102 ((7) in FIG. 3).

In a case of receiving the first print execution request from the sound input device 500 in T102, the service mediating server 200 specifies, in the voice table 240, the service information SI associated with the voice data "contents printing" included in the first print execution request, and specifies, in the user table 242, the communication information CH associated with the device ID "Device" included in the first print execution request. Then, the service mediating server 200 sends a service provision request including the specified service information SI and the specified communication information CH to the service providing server 100 in T110 ((10) in FIG. 3). More specifically, the service provision request includes a character string indicating the service information SI as one character string corresponding to an identifier that indicates the service information, and the communication information CH (that is, the RT and the printer ID "Printer1") as one character string corresponding to an identifier that indicates the access token.

In a case of receiving the service provision request from the service mediating server 200 in T110, the service providing server 100 specifies, in the server table 140, the URL "U" associated with the service information SI included in the service provision request, and extracts the RT and the printer ID "Printer1" from the communication information CH included in the service provision request. T112 and T114 are same as T32 and T34 in FIG. 5. In T120, the service providing server 100 sends a print data request including the specified URL "U" to the image distributing server 400 ((11) in FIG. 3).

In a case of receiving the print data request from the service providing server 100 in T120, the image distributing server 400 sends print data PD to the service providing server 100 in T122 ((12) in FIG. 3).

In a case of receiving the print data PD from the image distributing server 400 in T122, the service providing server 100 sends to the print mediating server 300 a second print execution request including the received print data PD, the extracted printer ID "Printer1", and the extracted AT, in T130 ((13) in FIG. 3).

In a case of receiving the second print execution request from the service providing server 100 in T130, the print mediating server 300 generates a job ID "J", and registers a print job in T132. The print job includes the generated job ID "J", the print data PD included in the second print execution request, and the printer ID "Printer1" included in the second print execution request.

In T140, the print mediating server 300 sends a job notification to the printer PR1 identified by the registered printer ID "Printer1" ((14) in FIG. 3). The job notification includes the printer ID "Printer1" included in the registered print job and the job ID "J" included in the registered print job.

In a case of receiving the job notification from the print mediating server 300 in T140, the printer PR1 sends a print job request including the job ID "J" included in the job notification to the print mediating server 300 in T142 ((15) in FIG. 3).

In a case of receiving the print job request from the printer PR1 in T142, the print mediating server 300 specifies the print job identified by the job ID "J" included in the print job request. In T150, the print mediating server 300 sends to the printer PR1 a print instruction including the print data PD in the specified print job ((16) in FIG. 3).

In a case of receiving the print instruction from the print mediating server 300 in T150, the printer PR1 executes printing according to the print data PD included in the print instruction in T152. When the process of T152 is completed, the process of FIG. 6 is terminated.

Effects of Embodiment

According to the present embodiment, in the case of receiving the communication information request from the service mediating server 200 (T13 in FIG. 5), the registration mediating server 10 sends the RT request to the print mediating server 300 (T14), receives the RT from the print mediating server 300 (T30), sends the printer ID request to the print mediating server 300 (T40), and receives the printer IDs "Printer1" and "Printer2" from the print mediating server 300 (T42). Then, the registration mediating server 10 sends the communication information CH including the RT and the printer ID "Printer1" to the service mediating server 200 (T54). As a result, the service mediating server 200 registers the communication information CH (T56). After this, in the case where the instruction that a printer is to be caused to execute printing of an image distributed by the image distributing server 400 is inputted by voice in the sound input device 500 (T100 in FIG. 6) without the printer ID "Printer1" of the printer PR1 being inputted by voice, the first print execution request is sent from the sound input device 500 to the service mediating server 200 (T102). Due to this, the service mediating server 200 sends the service provision request including the service information SI and the communication information CH to the service providing server 100 (T110). In this case, the service providing server 100 extracts the RT and the printer ID "Printer1" from the communication information CI1, sends the AT request including the RT to the print mediating server 300 (T112), and then receives the AT from the print mediating server 300 (T114). Further, the service providing server 100 specifies the URL "U" associated with the service information SI, sends the print data request including the URL "U" to the image distributing server 400 (T120), and receives the print data PD from the image distributing server 400 (T122). Due to this, the service providing server 100 can send the second print execution request including the print data PD, the printer ID "Printer1", and the AT to the print mediating server 300 (T130). As a result, the print instruction including the print data PD is sent from the print mediating server 300 to the printer PR1 by using the printer ID "Printer1" (T150), thus the printing according to the print data PD included in the print instruction is executed in the printer PR1 (T152). As such, the user does not need to input the printer ID "Printer1" of the printer PR1 to the sound input device 500 by voice, thus can easily cause the printer PR1 to execute printing by using the sound input device 500.

(Corresponding Relationships)

The mobile terminal TE, the print mediating server 300, and the printer PR1 are respectively examples of "terminal device", "function mediating server", and "function executing device". The RT and the AT are respectively examples of "first authentication information" and "second authentication information". The printer ID "Printer1" is an example of "specific execution information" and "related information". Voice is an example of "sound". The first print execution request in T102, the second print execution request in T130, and the print instruction in T150 of FIG. 6 are respectively examples of "first function execution instruction", "second function execution instruction", and "function execution instruction". The user table 242 is an example of "memory". The printer list in T46 of FIG. 5 is an example of "designation screen". The printer ID is an example of "identification information".

The process of T13, the process of T14, the process of T30, the process of T40, the process of T42, and the process of T54 of FIG. 5 are respectively examples of "receive from a service mediating server a communication information request", "send to a function mediating server a first authentication information request", "receive the first authentication information from the function mediating server", "send to the function mediating server, by using the first authentication information, an execution information request", "receive specific execution information from the function mediating server", and "send to the service mediating server the communication information".

The process of T110 and the process of T130 of FIG. 6 are respectively examples of "receive from a service mediating server a service provision request" and "send a second function execution request to the function mediating server".

Figure 7:
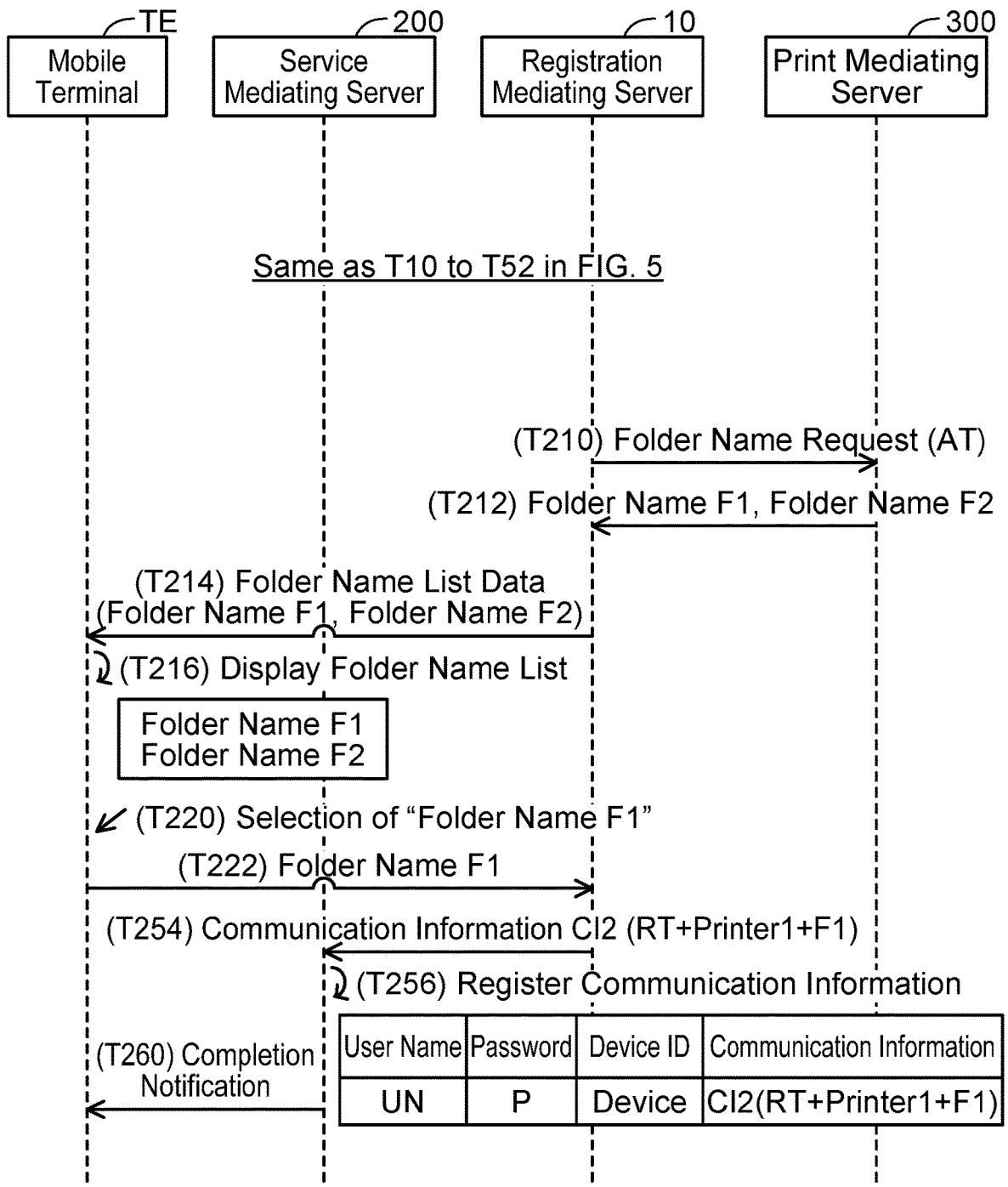
FIG. 7 shows a sequence diagram of a registration process according to a second embodiment.
Figure 8:
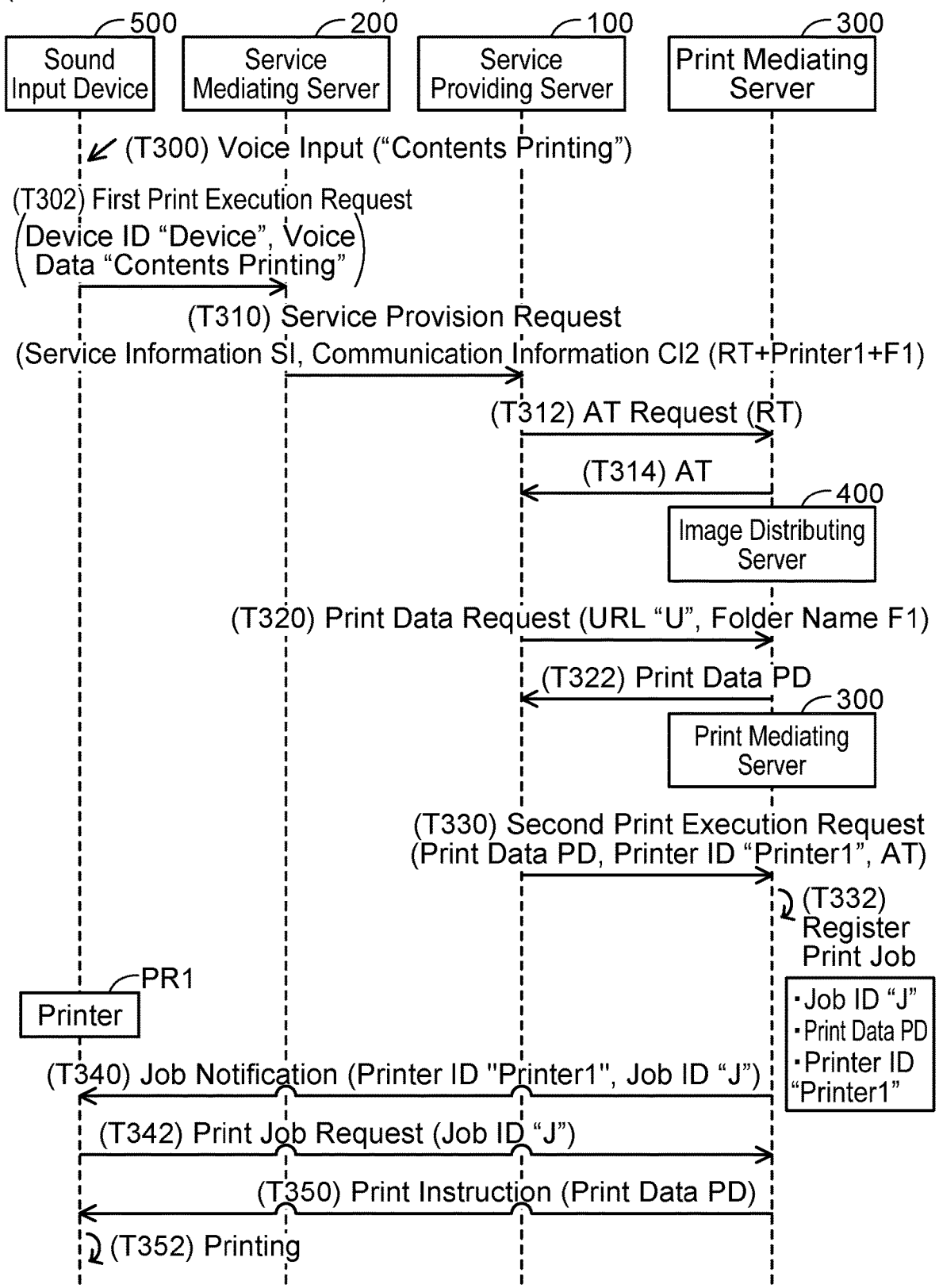
FIG. 8 shows a sequence diagram of a print process according to the second embodiment.

Second Embodiment; FIGS. 7 and 8

Next, a second embodiment will be described with reference to FIGS. 7 and 8. The second embodiment differs from the first embodiment in that a folder name of a folder in which print data is stored is selected by the user. In this embodiment, the print mediating server 300 and the image distributing server 400 are configured as an integrated server. Due to this, the user table 342 of the print mediating server 300 (see FIG. 4) further stores folder names F1 and F2 in association with the account information AI, the printer IDs "Printer1" and "Printer2", and the token information. A folder name indicates a storage location of print data in the image distributing server 400. The folder names F1 and F2 are registered in the print mediating server 300, for example, by the user using the mobile terminal TE. Firstly, a registration process of the present embodiment will be described with reference to FIG. 7.

In this embodiment, firstly, processes same as T10 to T52 of FIG. 5 are executed. That is, the registration mediating server 10 receives the RT and the AT from the print mediating server 300 (T30 to T34), and receives the printer ID "Printer1" from the mobile terminal TE (T52). In T210, the registration mediating server 10 sends to the print mediating server 300 a folder name request that requests sending of a folder name registered in the print mediating server 300. The folder name request includes the AT.

In a case of receiving the folder name request from the registration mediating server 10 in T210, the print mediating server 300 specifies, in the user table 342, the folder names F1 and F2 associated with the token information that includes the AT included in the folder name request. Then, in T212, the print mediating server 300 sends the specified folder names F1 and F2 to the registration mediating server 10.

In a case of receiving the folder names F1 and F2 from the print mediating server 300 in T212, the registration mediating server 10 generates folder name list data representing a folder name list which is a list of received folder names in T214, and sends the folder name list data to the mobile terminal TE in T214.

In a case of receiving the folder name list data from the registration mediating server 10 in T214, the mobile terminal TE displays the folder name list represented by the folder name list data in T216. The folder name list includes the folder names F1 and F2.

In a case where the folder name F1 in the folder name list is selected by the user in T220, the mobile terminal TE sends the folder name F1 to the registration mediating server 10 in T222.

In a case of receiving the folder name F1 from the mobile terminal TE in T222, the registration mediating server 10 sends communication information CI2 including the RT, the printer ID "Printer1", and the folder name F1 to the service mediating server 200 in T254.

In a case of receiving the communication information CI2 from the registration mediating server 10 in T254, the service mediating server 200 registers, in T256, the communication information CI2 in the user table 242 in association with the user name UN that is logged in to the service mediating server 200. T260 is same as T60 in FIG. 5. When the process of T260 is completed, the process of FIG. 7 is terminated.

(Print Process; FIG. 8)

Next, a print process will be described with reference to FIG. 8. T300 and T302 are same as T100 and T102 in FIG. 6. It should be noted that in T300, the sound input device 500 does not accept either of the voice designating the printer ID "Printer1" nor a voice designating the folder name F1, from the user. In a case of receiving the first print execution request from the sound input device 500 in T302, the service mediating server 200 specifies the service information SI associated with the voice data "contents printing", and specifies the communication information CI2 associated with the device ID "Device". Then, the service mediating server 200 sends a service provision request including the specified service information SI and the specified communication information CI2 to the service providing server 100 in T310.

T312 and T314 are same as T112 and T114 in FIG. 6. In T320, the service providing server 100 sends a print data request including the URL "U" and the folder name F1 extracted from the communication information CI2 to the image distributing server 400.

In a case of receiving the print data request from the service providing server 100 in T320, the image distributing server 400 specifies print data PD stored in the folder name F1 included in the print data request, and sends the specified print data PD to the service providing server 100 in T322. T330 to T352 are same as T130 to T152 in FIG. 6. When the process of T352 is completed, the process of FIG. 8 is terminated.

In this embodiment as well, the user does not need to input the printer ID "Printer1" of the printer PR1 to the sound input device 500 by voice, thus can easily cause the printer PR1 to execute printing by using the sound input device 500. Further, in the present embodiment, the registration mediating server 10 sends the folder name request to the print mediating server 300 (T210 in FIG. 7) and receives the folder names F1 and F2 from the print mediating server 300 (T212). Further, the registration mediating server 10 sends the communication information CI2 including the folder name F1 to the service mediating server 200 (T254). As a result, the service mediating server 200 registers the communication information CI2 (T256). After this, in the case where the instruction that a printer is to be caused to execute printing of an image distributed by the image distributing server 400 is inputted by voice to the sound input device 500 without the folder name F1 being inputted by voice (T300 in FIG. 8), the first print execution request is sent from the sound input device 500 to the service mediating server 200 (T302). Due to this, the service mediating server 200 sends the service provision request including the service information SI and the communication information CI2 to the service providing server 100 (T310), and the service providing server 100 sends the print data request including the URL "U" and the folder name F1 to the image distributing server 400 (T320) and receives the print data PD from the image distributing server 400 (T322). Due to this, the service providing server 100 can send the second print execution request including the print data PD to the print mediating server 300 (T330). As a result, the print instruction including the print data PD is sent from the print mediating server 300 to the printer PR1 (T350), thus the printing according to the print data PD included in the print instruction is executed in the printer PR1 (T352). As such, the user does not need to input the folder name F1 to the sound input device 500 by voice, thus can easily cause the printer PR1 to execute printing by using the sound input device 500.

(Corresponding Relationships)

The image distributing server 400 is an example of "target server". The folder name F1 and the print data PD are examples of "specific execution information" and "related information".

(Variant 1) In the respective embodiments above, the service providing server 100 and the service mediating server 200 are configured as separate servers, however, no limitation is placed thereto. The service providing server 100 and the service mediating server 200 may be configured as an integrated server. In this variant, the integrated server is an example of "specific server".

(Variant 2) In the second embodiment, a print setting may be selected by the user instead of the folder name. In this case, the user table 342 of the print mediating server 300 further stores a plurality of print settings which the printer PR1 is capable of using. The registration mediating server 10 sends a print setting request including the AT to the print mediating server 300, receives the plurality of print settings which the printer PR1 is capable of using, and sends to the mobile terminal TE designation screen data representing a designation screen for designating one print setting from the plurality of print settings. In a case of receiving the designation screen data from the registration mediating server 10, the mobile terminal TE displays the designation screen, and in a case where one print setting (such as color, single side) is selected by the user in the designation screen, the mobile terminal TE sends the one print setting to the registration mediating server 10. In a case of receiving the one print setting from the mobile terminal TE, the registration mediating server 10 sends communication information including the RT, the printer ID "Printer1", and the one print setting to the service mediating server 200. As a result, the communication information is registered in the service mediating server 200. In this variant, the one print setting is an example of "specific execution information".

(Variant 3) Processes of (4.6) and (4.7) in FIG. 2 may be omitted. In this case, when the registration mediating server 10 receives one or more printer IDs from the print mediating server 300 (4.5), it specifies a printer ID, which is, for example, a printer ID that was recently registered, from among the one or more printer IDs and sends communication information including the RT and this printer ID to the service mediating server 200. In this variant, "send designation screen data to the terminal device" and "receive the specific execution information from the terminal device" may be omitted.

(Variant 4) In (2.1) in FIG. 2, the registration mediating server 10 may send an AT request instead of the RT request. In this case, the registration mediating server 10 receives an AT, without receiving the RT, from the print mediating server 300, and sends communication information including the AT and the printer ID to the service mediating server 200 in (5). In this case, in the case (10) of receiving the service provision request from the service mediating server 200, the service providing server 100 extracts the AT and the printer ID from the communication information included in the service provision request, omits the processes of (10.1) and (10.2), and executes the processes of (11) to (13). In this variant, "send to the function mediating server a second authentication information request" and "receive the second authentication information from the function mediating server" by the "registration mediating server" may be omitted, and "send to the function mediating server a second authentication information request" and "receive the second authentication information from the function mediating server" by the "service providing server" may be omitted. Further, the AT is an example of "first authentication information".

(Variant 5) In the embodiments above, the image distributing server 400 is the server that executes distribution of print data, however, no limitation is placed thereto. The image distributing server 400 may be a server configured to store image data uploaded by the user. In this case, the image distributing server 400 stores a folder name indicating a storage location of this image data. In the case of receiving the communication information from the service mediating server 200 in T13 in FIG. 5, the registration mediating server 10 executes the processes of T14 to T52 with the print mediating server 300 and further executes processes that are same as T14 to T52 except for that the folder name is used instead of the printer ID, with the image distributing server 400. That is, the registration mediating server 10 sends an RT request to the image distributing server 400, receives an RT of the image distributing server 400 (hereinbelow termed "RT'") from the image distributing server 400, sends an AT request including the RT' to the image distributing server 400, receives an AT of the image distributing server 400 (hereinbelow termed "AT'") from the image distributing server 400, sends a folder name request including the AT' to the image distributing server 400, receives folder name(s) from the image distributing server 400, and sends folder name list data to the mobile terminal TE. Then, in a case where one folder name in a folder name list displayed in the mobile terminal TE is selected, the registration mediating server 10 receives this one folder name from the mobile terminal TE. As a result, the registration mediating server 10 sends to the service mediating server 200 communication information including the RT received from the print mediating server 300, the printer ID "Printer1", the RT' received from the image distributing server 400, and the folder name. Due to this, the communication information is registered in the service mediating server 200. After this, in the case of receiving the first print execution request from the sound input device 500, the service mediating server 200 sends a service provision request including the registered communication information to the service providing server 100. In this case, the service providing server 100 extracts the RT, the printer ID "Printer1", the RT', and the folder name from the received communication information, sends an AT request including the RT' to the image distributing server 400, receives the AT' from the image distributing server 400, sends a print data request including the AT' and the extracted folder name to the image distributing server 400, and receives print data from the image distributing server 400. After this, processes that are same as T112, T114, and T130 to T152 in FIG. 6 are executed. In this variant as well, the user does not need to input the printer ID "Printer1" of the printer PR1 and the folder name to the sound input device 500 by voice, thus can easily cause the printer PR1 to execute printing by using the sound input device 500.

(Variant 6) The "function executing device" is not limited to the printer PR, and may be a scanner, for example. In this case, in (5) in FIG. 2, the registration mediating server 10 sends to the service mediating server 200 communication information including a scanner ID that identifies a scanner, instead of the printer ID. Further, in the case of receiving the service provision request from the service mediating server 200 ((10) in FIG. 3), the service providing server 100 extracts the RT and the scanner ID from the communication information included in the service provision request. Then, the service providing server 100 executes processes that are same as (10.1) and (10.2), and sends a scan execution request including the scanner ID and the AT to a storage server for storing scan data. As a result, from the storage server, a scan instruction that instructs a scanner to execute scanning is sent to the scanner identified by the scanner ID included in the scan execution request, and scanning is executed in the scanner, by which scan data is generated. Then, this scan data is sent from the scanner to the storage server. (Variant 7) In the respective embodiments above, the processes of FIGS. 2, 3, and 5 to 8 are realized by software (that is, the registration app 38 and the print app 138), however, at least one of these processes may be realized by hardware, such as a logic circuit.

What is claimed is:
1. A communication system comprising:
   a terminal device;
   a specific server;
   a registration mediating server;

a function mediating server;
a sound input device; and
a function executing device,
wherein
the terminal device sends to the specific server a registration request for requesting a registration of communication information,
in a case where the registration request is received from the terminal device, the specific server sends to the registration mediating server a communication information request for requesting sending of the communication information,
in a case where the communication information request is received from the specific server, the registration mediating server sends to the function mediating server a first authentication information request for requesting sending of first authentication information,
in a case where the first authentication information request is received from the registration mediating server, the function mediating server sends the first authentication information to the registration mediating server,
in a case where the first authentication information is received from the function mediating server, the registration mediating server sends to the function mediating server, by using the first authentication information, an execution information request for requesting sending of execution information, the execution information being for causing the function executing device to execute a function,
in a case where the execution information request is received from the registration mediating server, the function mediating server sends specific execution information to the registration mediating server,
in a case where the specific execution information is received from the function mediating server, the registration mediating server sends to the specific server the communication information including the first authentication information and the specific execution information,
in a case where the communication information is received from the registration mediating server, the specific server registers the communication information in a memory of the specific server,
in a case where an execution request of the function is inputted by sound without the specific execution information being inputted by sound, the sound input device sends a first function execution request to the specific server,
in a case where the first function execution request is received from the sound input device, the specific server extracts the first authentication information and the specific execution information from the communication information, and sends a second function execution request to the function mediating server by using the extracted first authentication information, the second function execution request including related information which is related to the extracted specific execution information,
in a case where the second function execution request is received from the specific server, the function mediating server sends a function execution instruction to the function executing device by using the related information included in the second function execution request, and in a case where the function execution instruction is received from the function mediating server, the function executing device executes the function.

2. The communication system as in claim 1, wherein
the specific server includes a service mediating server and a service providing server configured separately from the service mediating server,
the terminal device sends the registration request to the service mediating server,
in the case where the registration request is received from the terminal device, the service mediating server sends the communication information request to the registration mediating server,
in the case where the specific execution information is received from the function mediating server, the registration mediating server sends the communication information to the service mediating server,
in the case where the communication information is received from the registration mediating server, the service mediating server registers the communication information in the memory of the service mediating server,
in the case where an execution request of the function is inputted by sound without the specific execution information being inputted by sound, the sound input device sends the first function execution request to the service mediating server,
in the case where the first function execution request is received from the sound input device, the service mediating server sends to the service providing server a service provision request including the communication information registered in the memory, and
in a case where the service provision request is received from the service mediating server, the service providing server extracts the first authentication information and the specific execution information from the communication information included in the service provision request, and sends to the function mediating server, by using the extracted first authentication information, the second function execution request including the related information which is related to the extracted specific execution information.

3. A non-transitory computer-readable recording medium storing computer-readable instructions for a registration mediating server,
wherein the computer-readable instructions, when executed by a computer of the registration mediating server, cause the registration mediating server to:
receive from a service mediating server a communication information request for requesting sending of communication information, wherein the communication information request is sent from the service mediating server to the registration mediating server in a case where a registration request for requesting registration of the communication information is sent from a terminal device to the service mediating server;
in a case where the communication information request is received from the service mediating server, send to a function mediating server a first authentication information request for requesting sending of first authentication information;
in a case where the first authentication information request is sent to the function mediating server, receive the first authentication information from the function mediating server;
in a case where the first authentication information is received from the function mediating server, send to the function mediating server, by using the first authentication information, an execution information request for requesting sending of execution information, the execution information being for causing a function executing device to execute a function;

in a case where the execution information request is sent to the function mediating server, receive specific execution information from the function mediating server; and in a case where the specific execution information is received from the function mediating server, send to the service mediating server the communication information including the first authentication information and the specific execution information, wherein the communication information is registered in the service mediating server, in a case where an execution request of the function is inputted to a sound input device by sound without the specific execution information being inputted to the sound input device by sound after the communication information has been registered, a first function execution request is sent from the sound input device to the service mediating server, in a case where the first function execution request is received by the service mediating server, a service provision request including the communication information registered in the service mediating server is sent from the service mediating server to a service providing server, in a case where the service provision request is received by the service providing server, the first authentication information and the specific execution information are extracted by the service providing server from the communication information included in the service provision request, and a second function execution request including related information which is related to the extracted specific execution information is sent from the service providing server to the function mediating server by using the extracted first authentication information, in a case where the second function execution request is received by the function mediating server, a function execution instruction is sent from the function mediating server to the function executing device by using the related information included in the second function execution request, and in a case where the function execution instruction is received by the function executing device, the function is executed by the function executing device.

4. The non-transitory computer-readable recording medium as in claim 3, wherein in a case where the first authentication information request is received by the function mediating server, confirmation screen data is sent from the function mediating server to the terminal device, the confirmation screen data representing a confirmation screen for confirming whether to send the first authentication information, in a case where it is instructed that the first authentication information is to be sent on the confirmation screen after the confirmation screen represented by the confirmation screen data has been displayed in the terminal device, a sending instruction for instructing sending of the first authentication information is sent from the terminal device to the function mediating server, and in a case where the sending instruction is received by the function mediating server, the first authentication information is received from the function mediating server.

5. The non-transitory computer-readable recording medium as in claim 3, wherein in the case where the execution information request is sent to the function mediating server, a plurality of the execution information including the specific execution information is received from the function mediating server, and the computer-readable instructions, when executed by the computer, further cause the registration mediating server to:

in a case where the plurality of the execution information is received from the function mediating server, send designation screen data to the terminal device, the designation screen data representing a designation screen for designating the specific execution information from the plurality of the execution information; and in a case where the specific execution information is designated from the plurality of the execution information on the designation screen after the designation screen represented by the designation screen data has been displayed in the terminal device, receive the specific execution information from the terminal device, wherein in a case where the specific execution information is received from the terminal device, the communication information including the first authentication information and the specific execution information is sent to the service mediating server.

6. The non-transitory computer-readable recording medium as in claim 3, wherein the computer-readable instructions, when executed by the computer, further cause the registration mediating server to:

in a case where the first authentication information is received from the function mediating server, send to the function mediating server a second authentication information request for requesting sending of second authentication information, the second authentication information request including the first authentication information; and in a case where the second authentication information request is sent to the function mediating server, receive the second authentication information from the function mediating server, wherein in a case where the second authentication information is received from the function mediating server, the execution information request including the second authentication information is sent to the function mediating server.

7. The non-transitory computer-readable recording medium as in claim 3, wherein the first authentication information is a refresh token.

8. The non-transitory computer-readable recording medium as in claim 3, wherein the execution information is identification information for identifying the function executing device.

9. The non-transitory computer-readable recording medium as in claim 3, wherein the communication information is sent to the service mediating server as one character string including the first authentication information and the specific execution information.

10. A non-transitory computer-readable recording medium storing computer-readable instructions for a service providing server,
wherein the computer-readable instructions, when executed by a computer of the service providing server, cause the service providing server to:
receive from a service mediating server a service provision request including communication information, the communication information including first authentication information and specific execution information for causing a function executing device to execute a function; and
in a case where the service provision request is received from the service mediating server, extract the first authentication information and the specific execution information from the communication information included in the service provision request, and send a second function execution request to a function mediating server by using the extracted first authentication information, the second function execution request including related information which is related to the extracted specific execution information,
wherein in a case where an execution request of the function is inputted to a sound input device by sound without the specific execution information being inputted to the sound input device by sound, a first function execution request is sent from the sound input device to the service mediating server,
in a case where the first function execution request is received by the service mediating server, the service provision request including the communication information is sent from the service mediating server to the service providing server,
in a case where the second function execution request is received by the function mediating server, a function execution instruction is sent from the function mediating server to the function executing device by using the related information included in the second function execution request, and
in a case where the function execution instruction is received by the function executing device, the function is executed by the function executing device.

11. The non-transitory computer-readable recording medium as in claim 10, wherein
the computer-readable instructions, when executed by the computer, further cause the service providing server to:
in a case where the first authentication information and the specific execution information are extracted from the communication information, send to the function mediating server a second authentication information request for requesting sending of second authentication information, the second authentication information request including the first authentication information; and
in a case where the second authentication information request is sent to the function mediating server, receive the second authentication information from the function mediating server,
wherein in a case where the second authentication information is received from the function mediating server, the second function execution request including the second authentication information is sent to the function mediating server.

12. The non-transitory computer-readable recording medium as in claim 10, wherein
the function executing device is a printer capable of executing printing,
the related information is print data representing an image to be printed,
the specific execution information is storage location information indicating a storage location of the print data in a target server, and
the computer-readable instructions, when executed by the computer, further cause the service providing server to:
in a case where the first authentication information and the specific execution information are extracted from the communication information, acquire the print data which is the related information from the target server by using the storage location information which is the specific execution information,
wherein in a case where the print data is acquired from the target server, the second function execution request including the print data is sent to the function mediating server,
in a case where the second function execution request is received by the function mediating server, the function execution instruction including the print data included in the second function execution request is sent from the function mediating server to the function executing device, and
in a case where the function execution instruction is received by the function executing device, printing according to the print data is executed by the printer which is the function executing device.

* * * * *